T. D. ROBINSON.
ELECTRICAL SWITCH.
APPLICATION FILED JUNE 24, 1914.
1,200,523.
Patented Oct. 10, 1916.
4 SHEETS—SHEET 1.
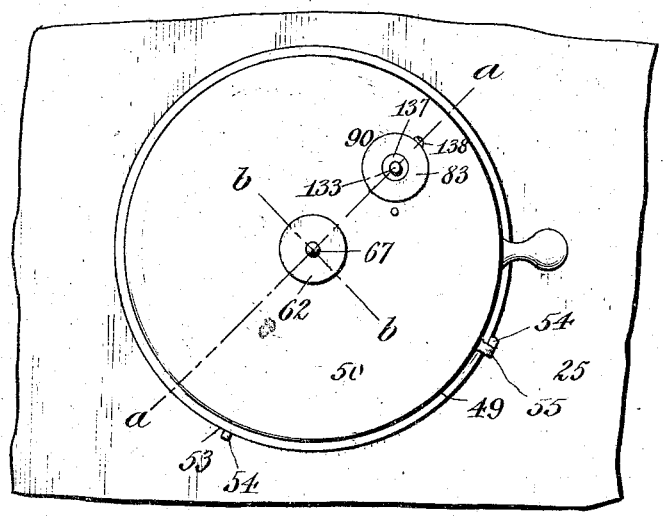
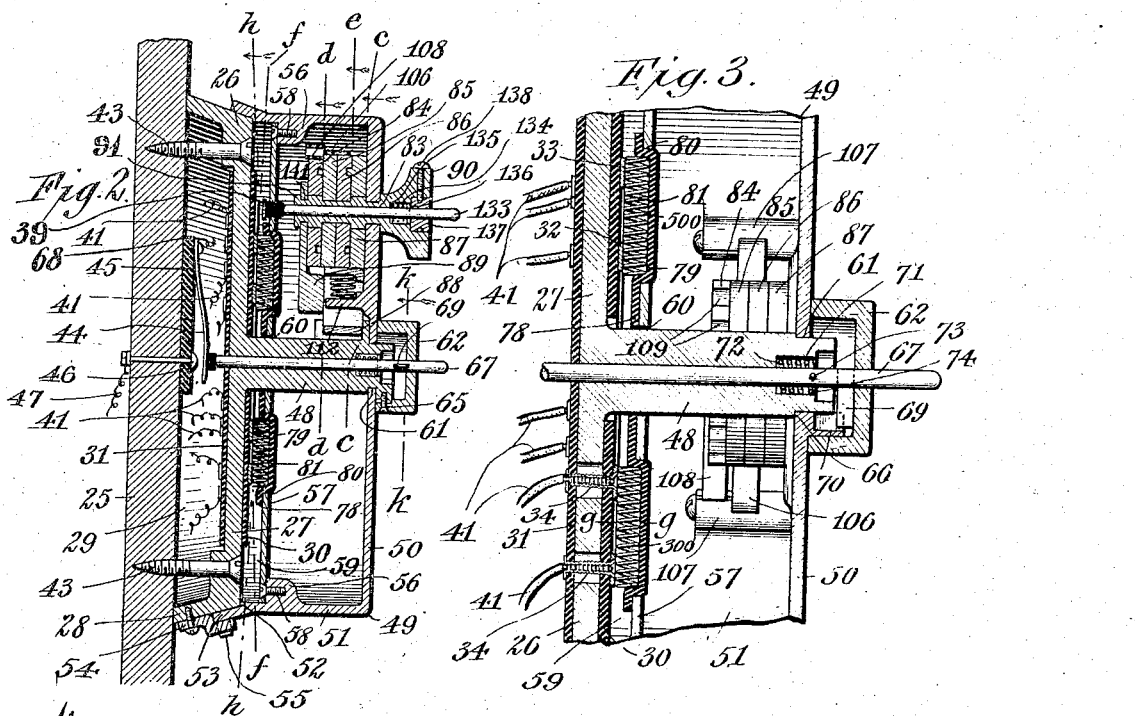
Theodore D. Robinson, Inventor

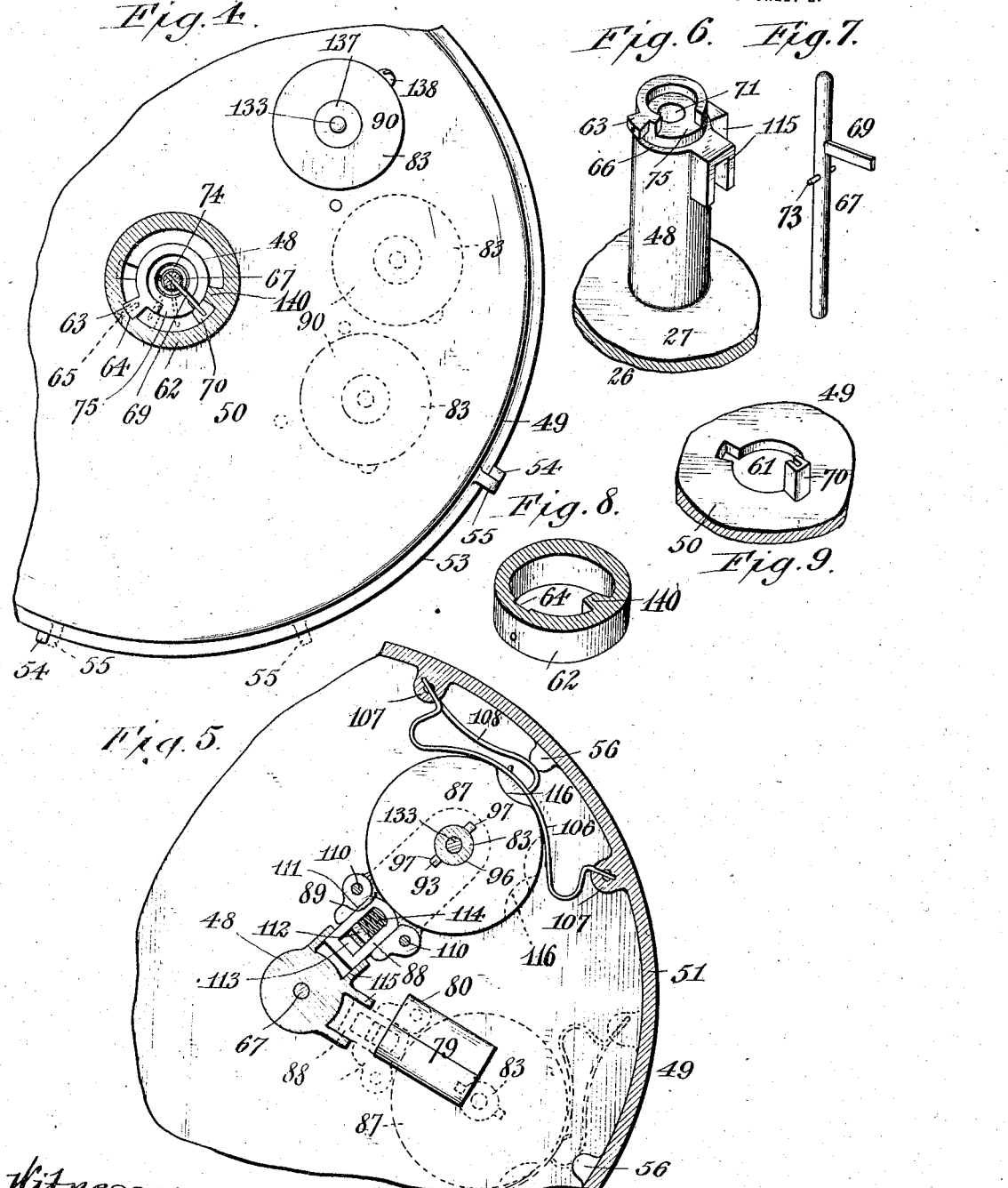

T. D. ROBINSON.
ELECTRICAL SWITCH.
APPLICATION FILED JUNE 24, 1914.
1,200,523.
Patented Oct. 10, 1916.
4 SHEETS—SHEET 3.
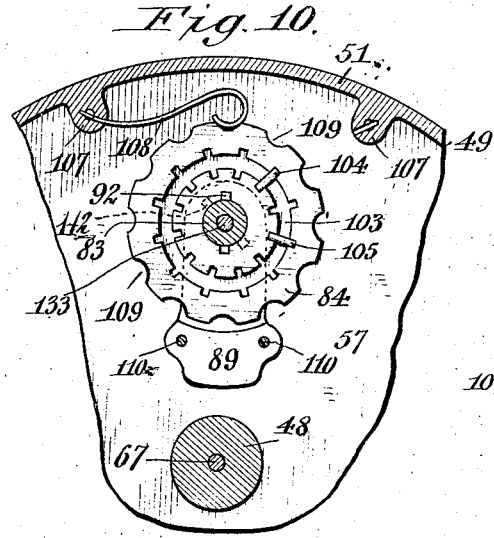
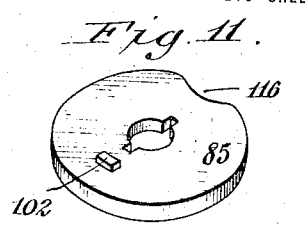
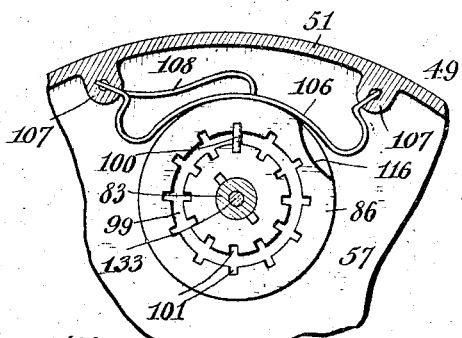
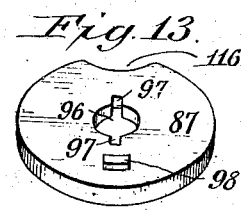
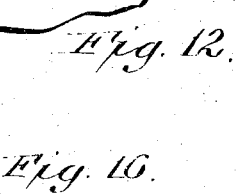
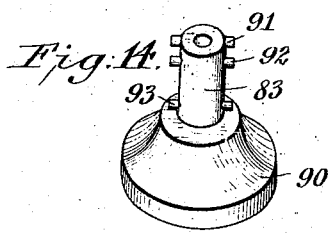
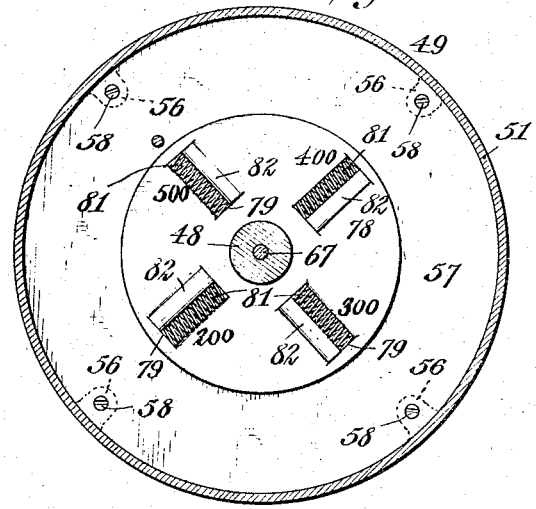
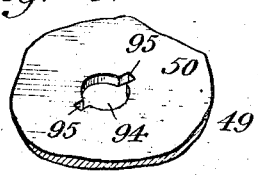
Witnesses:
Jacob Oberst, Jr.
Eda M. Schweiger
Theodore D. Robinson, Inventor.
By Emil Neuhart
Attorney.

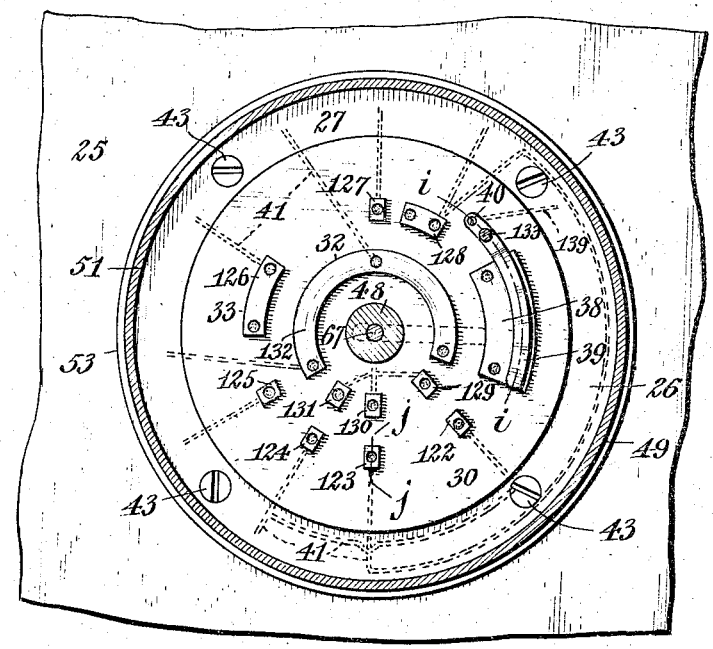
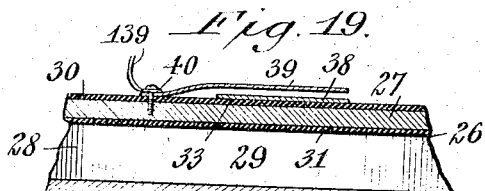
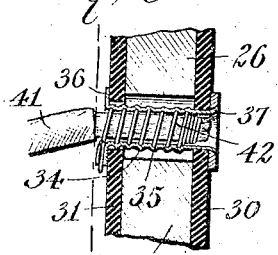
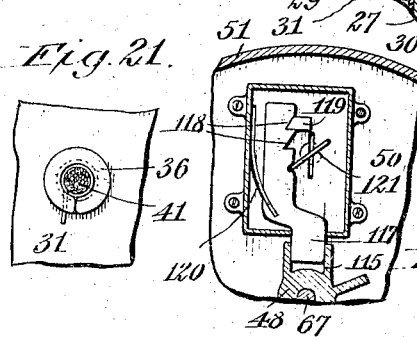
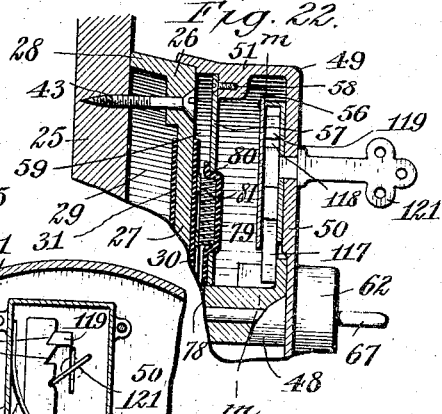

UNITED STATES PATENT OFFICE.

THEODORE D. ROBINSON, OF LOCKPORT, NEW YORK, ASSIGNOR TO AMPER ELECTRIC COMPANY, INC., OF LOCKPORT, NEW YORK, A CORPORATION OF NEW YORK.

ELECTRICAL SWITCH.

1,200,523.   Specification of Letters Patent.   Patented Oct. 10, 1916.

Application filed June 24, 1914. Serial No. 847,043.

*To all whom it may concern:*

Be it known that I, THEODORE D. ROBINSON, a citizen of the United States, residing at Lockport, in the county of Niagara and State of New York, have invented certain new and useful Improvements in Electrical Switches, of which the following is a specification.

My invention relates to electrical switches, and more particularly to switches controlling one or more serving devices.

One of the objects of my invention is to provide a switch wherein the manipulating element is locked in a certain position or positions so that the devices or apparatuses controlled thereby cannot be placed into use by unauthorized persons, such an arrangement being of particular advantage on automobiles and serving to effectually prevent surreptitious use or theft of the same.

Another object of my invention is the provision of a switch of the type mentioned having two members relatively movable for establishing and breaking electric circuits and one of said members provided with locking means to prevent relative movement of said members when in certain positions relatively.

Another object of my invention is the production of a switch having two main members relatively movable and one of said members equipped with locking mechanism whereby the members may be locked against movement, said locking mechanism having passed centrally therethrough means for causing an electric circuit to be established for actuating a serving device.

A further object of my invention is to provide a multiple switch whereby connection may be made to establish a plurality of circuits and wherein two co-acting contacts are at all times retained in unchangeable relation, yet rendered inoperative when parts of the switch are in certain positions.

A still further object of my invention is the production of a switch wherein one member is rotatable on the axis of another member to change the relation of certain contacts and wherein two contacts are retained in unchangeable relation.

Still further objects are to provide a switch with a plurality of circularly arranged fixed contacts and movable contacts co-acting therewith in changeable relation and with two co-acting contacts positioned coincident with the axis of said circularly arranged fixed contacts and retained in unchangeable relation; and to otherwise improve on switches of the type mentioned.

To these ends the invention consists in the novel features of construction and in the arrangement and combination of parts to be hereinafter described and more particularly pointed out in the appended claims.

The construction and operation of my invention will be clearly understood by reference to the following specification and the annexed drawings in which similar numerals of reference refer to similar parts in the several figures.

Figure 1 is a front elevation of my improved switch. Fig. 2 is an enlarged section taken diametrically through the switch on line $a$—$a$, Fig. 1. Fig. 3 is a still further enlarged section taken on the diametrical line $b$—$b$, Fig. 1. Fig. 4 is an enlarged front elevation of a portion of the switch with the central portion shown in section in the plane indicated by line $k$—$k$, Fig. 2. Fig. 5 is an enlarged cross section through a portion of the switch taken on line $c$—$c$, Fig. 2. Fig. 6 is an enlarged perspective view of the central portion of the switch base showing the axial post extending therefrom. Fig. 7 is an enlarged detached perspective view of the axial manipulating or plunger rod for establishing an electric circuit to cause actuation of a certain serving device. Fig. 8 is a detached sectional perspective view on an enlarged scale of the axial retainer bonnet. Fig. 9 is a perspective view of the central portion of the cap or cover, viewed from the interior. Fig. 10 is an enlarged transverse section through a portion of the switch taken on line $d$—$d$, Fig. 2. Fig. 11 is an enlarged detached perspective view of one of the tumblers of the permutation lock carried by the cap or cover. Fig. 12 is an enlarged transverse section through a portion of the switch taken on line $e$, Fig. 2. Fig. 13 is an enlarged detached perspective view of a second tumbler of the permutation locking mechanism. Fig. 14 is an enlarged detached perspective view of the spindle or manipulating member of the permutation locking mechanism. Fig. 15 is a detached perspective view of that portion of the cap or cover through which the spindle or manipulating member of the locking mechanism passes. Fig. 16 is a transverse section taken on line *f—f*, Fig. 2. Fig. 17 is a section taken on line *g—g*, Fig. 3. Fig. 18 is a transverse section taken on line *h—h*, Fig. 2. Fig. 19 is a section taken on line *i—i*, Fig. 18. Fig. 20 is an enlarged section taken through the base taken on line *j—j*, Fig. 18, showing the manner of connecting the circuit wires to the contacts of the base. Fig. 21 is a section taken on line *l—l*, Fig. 20. Fig. 22 is a radial section of a switch equipped with a key lock in lieu of the permutation lock above referred to. Fig. 23 is a transverse section taken on line *m—m*, Fig. 22.

My improved switch is applied to a switch support 25, such as the dash-board of an automobile, and is constructed to establish or break several electric circuits which include a plurality of serving devices. When used on an automobile the serving devices controlled by the switch may be, for example, the head-lights of the automobile, a tail-light, an audible signal, a self-starting device, a magneto or similar apparatus and an auxiliary battery ignition system. The serving devices just mentioned are those generally used on automobiles, but others may be used, or some of those mentioned may be omitted, as it is simply a matter of providing the necessary contacts for each and properly wiring the same to the serving devices employed to render the latter operative when manipulating the switch.

The switch has a base 26, which is preferably circular in formation and comprises a disk 27 and a flaring flange 28, the latter bearing against the dash-board 25 or other support forming a hollow space 29 in rear of said disk. To opposite sides of the disk portion of said base are applied two insulating members 30, 31, in the form of disks constructed of fiber or other suitable insulating material and on the outer insulating member 30 are applied two series or sets of fixed contacts 32, 33, respectively. Said insulating members and fixed contacts are fastened in place with elongated eyelets 34 having spiral grooves 35 spun or otherwise formed therein, each eyelet having an outstanding flange 36 at one end which bears against the inner insulating member of the base and being swaged outwardly at its other end to fit the flaring opening in the contact which it serves to secure in place, as at 37. The openings in the disk portion of the base through which said eyelets are passed are considerably larger than said eyelets so as to prevent the latter coming in contact with the metal of the base and cause a short circuit.

It is to be noted that the contacts of each series or set are of uneven lengths and that one of the contacts of one series or set is of a length to overlap a plurality of contacts of the other series or set, also that one of the contacts is considerably wider than the others.

Coöperating with the wide contact, which I will separately designate 38, is a spring arm 39 having one end free and extending over contact 38, and its other end fastened to the base, as at 40. Each of several circuit wires 41 is connected to the fixed contacts with a wire 42 wound spirally around its end, said wires being threaded into the spiral grooves 35 in the eyelets and providing a convenient and reliable connection to the contacts.

The base 26 is secured to the dash-board or other support with screws 43 or other suitable fastening devices and fastened to said support is a flexible contact 44 in the form of a spring arm fastened at one of its ends to an insulating member 45 and having its other end intersected by the axis of said base. Co-incident with said axis is a fixed contact 46, which is preferably passed through the dash-board or other support and has a circuit wire 47 secured thereto.

Arranged axially on the base and extending forwardly therefrom is a post 48 about the axis of which is adapted to rotate a cap or casing 49, the latter having a flat front or face wall 50 and a cylindrical circumferential wall 51 provided with an internal shoulder 52 adapted to bear against the face of the base and a flaring flange 53 surrounding and lying in contact with the peripheral surface of said base. Said cap or casing 49 is limited in its rotary movement by stops 54 on the edge or peripheral face of the base against which a lug 55 on said cap or casing is adapted to bear. Said stops are spaced apart the necessary distance so that all electrical connections provided for in the switch can be made within the range of movement of said cap or casing and as the extent of movement may in some instances be greater than allowance is made for in the drawings, while in others it may be less, I preferably fasten the stops to the base in a manner to readily permit their attachment in any spaced relation.

The cap or casing 49 has internal lugs 56 formed thereon to which a disk 57 is fastened by means of screws 58, said disk being so positioned within the cap or casing that a space 59 intervenes between the same and the face of the base.

The forwardly extending post 48 of the base extends through registering openings 60, 61, in the disk 57 and face wall 50 of said casing, respectively, said post projecting beyond said wall and having its projecting end covered with a bonnet 62 fastened to said end. For this purpose the post 48 has a radially extending lug 63 at its end which is adapted to enter an internal groove 64 in said bonnet, thus preventing rotary movement of the bonnet, and to prevent lengthwise movement, a screw 65 is passed through said bonnet and takes into said lug.

The portion of the post 48 within and projecting beyond the opening 61 of the face wall of the casing is reduced in diameter to provide a shoulder 66 against which said face wall bears. Extending axially through the post 48, the disk portion of the base 26 and the inner insulating member of said base is a push-rod or pin 67 which is provided at its inner end with an insulation terminal bearing against or adapted to bear against the spring arm 44 and serving to press said spring arm against the fixed contact 46 and close an electric circuit to place a serving device into action or condition for action, as the case may be. For this purpose the spring arm 44 has a circuit wire 68 secured thereto.

The serving device intended to be placed into action by depression of the push rod or pin 67 when using the switch on an automobile is a horn or other audible signal and said rod or pin is free to be depressed except when the casing or cap 49 is locked against rotation.

To prevent depressing the push rod or pin at such times, it has a laterally extending arm 69 which extends into and is adapted to be retained in a slotted lug 70 rising from the face wall of the casing so that when the latter is rotated, the push rod or pin will also rotate. The bore of the post 48 in which said push rod or pin is slidable is enlarged near the outer end of the post, as at 71, to provide a shoulder 72 and an abutment pin 73 is passed through said rod or pin and extends therefrom at diametrically opposite points. Surrounding said push rod or pin between the projecting ends of said abutment pin and the shoulder 72 is a spiral spring 74 which serves to maintain said push-rod or pin in projected position, in which position its outer end projects through the bonnet 62 so that it may be conveniently manipulated. The said bore of post 48 is further enlarged at its outer end and the wall surrounding this enlargement of the bore is cutaway, as at 75, to permit the laterally extending arm 69 of the push-rod or pin freedom in action when the casing or cap 49 is moved to certain positions, thus permitting the push-rod or pin to be depressed to bring the spring arm 44 in engagement with the fixed contact 46. When, however, the casing is moved to a position in which the extending arm 69 is out of line with the cut-away portion 75 of the axial post, the push-rod or pin cannot be depressed for the reason that said arm will strike the edge of the wall surrounding the end enlargement of the bore of said post, said arm being normally held in a plane beyond the end of said post, as best shown in Fig. 3.

To guard against turning of the cap or casing in the event of the stops 54 of the base or the lug 55 on the cap being mischievously broken off, I provide the bonnet 62 with an internal stop 140 which limits the movement of said cap or casing in one direction by reason of the slotted lug 70 on the cap or casing striking said stop, said lug 70 being adapted to strike the radially extending lug 63 on the post 48 to limit the movement of the cap or casing in the opposite direction. These parts being inaccessible owing to their location within the bonnet.

The disk 57 has applied to its inner face an insulating member 78 in the form of a disk constructed of fiber or other suitable material and pressed or otherwise formed in this disk at regular intervals, herein shown at four points spaced equi-distantly, are pockets 79 which are entered in openings 80 formed in said disk 57. Suitable contacts 81 are situated in said pockets and each is adapted, at times, to bridge two coöperating fixed contacts of the two series or sets secured to the base.

The contacts 81 are of course movable with the casing or cap and lie in contact with the outer insulating member of the base or the fixed contacts thereon. The insulating member 78 is consequently pressed at all times against the disk 57 of the casing and it is held against rotary movement independent of said disk by reason of the pockets thereof being entered in the openings 80.

The movable contacts 81 are preferably in the form of rollers constructed of wire coiled into spiral form and are of sufficient length to bridge coöperating contacts of the two series or sets on the base. As there is a possibility of an arc being formed between the fixed contacts of the base and the movable contacts of said casing when the latter pass over the ends of said fixed contacts, a solid roller 82 of insulating material is situated in each pocket 79 and rolls in contact with the wire roller, thus preventing the formation of an arc which would cause sparking and consequent injury to the contacts. The flexible wire roller contacts are preferably employed, since they assure a perfect contact being made even though the surface over which they roll is uneven.

To lock the casing against movement when in certain position, I have provided suitable locking mechanism which is situated within the casing but controllable from without. In preferred form a permutation lock is employed which consists of a spindle 83, tumblers 84, 85, 86, 87, a lock-bolt 88 and a lock-bolt support or bracket 89. The spindle of said locking mechanism is passed into the casing from the exterior and is provided with a head or enlargement 90 which serves as a convenient means for manipulating said mechanism. Studs or pins 91, 92, and 93 extend from said spindle at diametrically opposite points and at different points in its length, and in order to permit the spindle to be inserted into the casing the face wall of the latter has an opening 94 provided with opposite notches 95 through which notches the studs or pins on said spindle are passed. The spindle is rotatable in the face wall of the casing and the tumbler 87 is secured to said spindle adjacent said face wall, said tumbler having an axial bore 96 with opposite notches 97 to receive the studs or pins 93 of said spindle, thus holding said tumbler against rotation on said spindle. The tumblers 85, 86 are rotatable on said spindle, and each has an axial bore with notches similar to tumbler 87, so that the spindle with its studs or pins may be passed therethrough. The extent of rotation of each tumbler 85, 86, is limited, as will presently appear. Tumbler 87 has a lug 98 on its inner face which enters an annular groove 99 in the outer or opposing face of the adjacent tumbler 86 and in this groove is a removable stop 100 entered in a pair of a series of pairs of radial notches 101 opening into said groove. Tumbler 85 has a lug 102 on its inner face which enters an annular groove 103 in tumbler 84, it being adapted to engage movable stops 104, 105, held in position similar to stop 100 on tumbler 86.

A spring 106, of flat material curved to conform to the perimeters of the tumblers and of a width to engage tumblers 85 and 86 has its ends secured to lugs 107 formed on the circumferential wall of the casing and serves to hold said tumblers against rotation except when actuated by the spindle through the medium of tumblers 84, 87.

A detent spring 108 is provided to engage in any one of a series of peripheral notches 109 in the tumbler 84, said spring being secured to one end of the lugs 107.

The inner end of the spindle receives support from the lock-bolt support or bracket 89 which is fastened to the face wall of the casing by screw bolts 110, said bracket having an opening 141 similar to the openings in the tumblers and through the opposite notches 142 of this opening, the studs or pins 91 of the spindle are passed, said studs lying in rear of said bracket and preventing withdrawal of the spindle therefrom except when they are in registration with said notches. Said notches 142 are arranged out of line with like notches of the tumblers and the notches 95 in the face wall of the cap or casing, so that the spindle 83 cannot be removed while the parts are in operative position. In order the remove said spindle it is necessary to turn the support or bracket 89 to bring the notches 142 in line with the pins 91. Said bracket has associated therewith a slideway 111 in which is located an abutment 112. The lock-bolt 88 is slidably fitted in said slideway and provided with an elongated slot 113 in which is arranged an expansion spring 114 bearing with one end against said abutment and with its other end against one end of said slot, thus tending to force said lock-bolt against the tumblers. Said post has formed thereon two radially extending pockets 115 in which said lock-bolt is adapted to enter and when said lock-bolt is entered in either of said pockets, the casing is locked against movement. The outer end of said lock-bolt is adapted to enter peripheral notches 116 in the tumblers 85, 86, 87, when the latter are positioned to bring said notches in line with said bolt, and at such times said bolt is disengaged from the pockets 115 on the post of the base, thus allowing the casing to be rotated to the desired position.

In Figs. 22 and 23 of the drawings I have shown a key-controlled lock, in which a lock-bolt 117 is arranged slidably within the casing and adapted to enter either of the pockets 115, said bolt having notches 118 adapted to have entered therein a fixed lug 119, the lug being retained in engagement with either of said notches by a spring 120. When the lock-bolt is in engagement with either of the pockets on said post the lug 119 is entered in the outer notch of said bolt, and when said bolt is in retracted or unlocked position, said lug is entered in the inner notch of said bolt. A key 121 is employed to actuate said lock-bolt.

Although I have shown a permutation lock and a key-actuated lock, each of a particular construction, it is apparent that any means for locking the casing against movement may be employed whether locking against the axial post of the base, or otherwise.

Owing to the fact that the contacts 81 are movable in a circular path, the two series or sets of fixed contacts on the base are circularly arranged. The contacts of the outer series I have designated, respectively, by the numerals 122, 123, 124, 125, 126, 127, 128, and 38; and those of the inner series, respectively, by the numerals 129, 130, 131, and 132. The inner and outer contacts coöperate as follows,—122 with 129; 123 with 130; 124 with 131, and 132 with 125, 126, 127, 128 and 38.

The four movable contacts I have designated, respectively, by the numerals 200, 300, 400, and 500. These contacts are movable into six different positions.

In the first position of the casing, the movable contact 200 bridges the fixed contacts 122 and 129, rendering, for example, a high tension magneto inoperative; contact 300 does not engage any of the fixed contacts and is therefore in inoperative position; and contacts 400 and 500 engage only the contact 132 and do not establish any electric circuits. In this position of the casing all the serving devices are inoperative, the lock-bolt of the locking mechanism is in line with one of the pockets 115 on the axial post of the base, and the outer end thereof entered in the peripheral notches 116 of the tumblers 85, 86, 87. Now upon operating the locking mechanism, the notches 116 of said three tumblers are moved out of line with said lock-bolt, and the latter is caused to ride onto the circular edges of the tumblers, thus forcing said lock-bolt into said pocket and locking the casing against rotation. In order to move the notches of said tumblers in line with said lock-bolt so as to allow its disengagement from the axial post of the base, it is necessary that the combination for operating the locking mechanism be known.

In the key-actuated locking mechanism the lock-bolt is moved into engagement with and out of engagement from said axial post by the mere turning of the key, which may be removed from the casing when the latter is locked against rotation.

In the second position of the casing the movable contact 200 is out of engagement with all fixed contacts and the high tension magneto, for example, placed into operative condition. The movable contact 300 bridges the fixed contacts 125 and 132, placing into use, for example, an auxiliary battery ignition system; the movable contact 400 is in engagement only with the fixed contact 132 and therefore does not establish any electrical circuit, while the movable contact 500 bridges the contacts 132 and 38, causing, for example, a self-starting device to be placed in condition for use, but which is adapted to be placed into actual use by depressing the spring arm 39 against the contact 38, such spring arm being brought into engagement with contact 38 by means of a push rod 133 passing through an axial bore in the spindle 83 of the permutation locking mechanism, said bore being enlarged near its outer end, as at 134, to provide a shoulder 135, and surrounding said push rod within said enlarged portion of the bore is an expansion spring which bears with one end against a pin 136 extending from said push rod at diametrically opposite points. The extreme outer end of said bore is further enlarged and receives a bushing 137 which is secured in place by means of a screw 138 passing through the enlargement or head of said spindle and entering an annular groove formed in the periphery of said bushing. Upon depressing the push rod so as to cause the spring arm 39 to engage the fixed contact 38, a self-starting device, for example, is placed into operation.

In the third position of the casing the movable contact 200 does not engage any of the fixed contacts, consequently the high tension magneto remains in operative condition. The movable contacts 300 and 400 are in engagement only with the contact 132 and therefore do not establish electrical circuits, while the contact 500 remains in engagement with the contacts 132 and 38 and thus retains the self-starter in operative condition to be actuated upon depressing the push rod 133, whereby the spring arm 39 is brought into engagement with contact 38.

In the fourth position of the casing the movable contact 200 bridges the fixed contacts 123 and 130. The movable contact 300 bridges the contacts 126 and 132 and places, for example, a tail-light into use. The movable contact 400 bridges contacts 127 and 132 and places, for example, head lights brightened into use, while the movable contact 500 retains engagement between the contacts 132 and 38 to enable the self-starting device to be placed into operation when depressing the push rod 133.

In the fifth position of the casing the movable contact 200 is out of engagement with all fixed contacts, and for this reason the magneto remains operative, the movable contact 300 retains engagement with contacts 126 and 132 and keeps the tail light burning. The contact 400 bridges the contacts 128 and 132 and places, for example, the head lights dimmed into use, said contact 128 being included in a circuit with the contacts 123 and 130, which latter have no connection with the magneto so that when the contact 200, in the fourth position, bridges the contacts 123, 130, the magneto is still operative. The movable contact 500 retains engagement between contacts 132 and 38 so that upon depressing the push rod 133 the self-starting device may be operated.

In the sixth position of the casing the movable contact 200 bridges the fixed contacts 124 and 131, thus rendering the magneto inoperative. The movable contact 300 retains engagement with contacts 126 and 132 and keeps the tail light burning. The movable contact 400 retains engagement with contacts 128 and 132 and keeps the head lights dimmed, while the contact 500 is moved out of engagement with all fixed contacts of the base.

The circuit wires are attached to the several contacts of this device in any suitable manner, as this is within the skill of any electrician, and as the wiring depends considerably on the purposes of the serving devices with which this switch is intended to be employed it is not believed that a detailed description of the circuits will be found necessary. It might, however, be stated that the contact 132 is operatively connected with a storage battery while the remaining contacts of the set or series, in which contact 132 is included, are grounded.

The contacts 122 and 124 have connection with the magneto. Contact 125 has connection with the auxiliary battery ignition system, which system is also operatively connected with contact 132. Contact 126 is connected with the tail light. Contact 127 has connection with the head-lights. Contact 128 has connection with the head-lights and also with the contact 123, while the contact 38 has connection through the medium of the spring-arm 39, and a circuit wire 139 with the self-starting device. Thus with the four movable contacts arranged to move into various positions into and out of contact with the fixed contacts of the base, any particular serving device or serving devices or any desired combination of serving devices may be placed into condition for use or into actual use, as may be desired, and when the device is applied to an automobile and the casing is in either its first or sixth position, it may be locked to prevent actuation of all or certain devices so that the automobile cannot be stolen or surreptitiously used by unauthorized parties.

Having thus described my invention, what I claim is,—

1. A switch comprising a base having fixed contacts thereon and a casing movable relatively to said base and provided with contacts adapted to connect certain contacts of said base, a push rod extending through said casing and base, and means for locking said push rod against movement when said casing is in a certain position.

2. In a switch, the combination of a base having an axial post extending therefrom and two circular series of contacts secured thereto, a casing rotatable about said post and having contacts adapted to bridge certain contacts of said base, locking mechanism adapted to engage said post and prevent rotation of said casing when the latter is in a certain position, and means for operating said locking mechanism from the exterior of said casing.

3. A switch comprising a base having an axial post extending therefrom and two circular series of contacts secured thereto, a casing rotatable on said post, a disk secured within said casing and provided with contact receiving pockets, contacts in said pockets adapted to bridge certain contacts on said base, and locking mechanism carried by said casing adapted to lock the latter against movement when in a certain position.

4. The combination of a base having an axial post provided with a pocketed extension and having contacts in circular arrangement about said post, a casing provided with contacts adapted to bridge certain contacts of the base and being rotatable on the latter, and a locking-bolt adapted to enter the pocketed extension of said post and being controllable from the exterior of said casing.

5. In a switch, the combination of a base having an axial post provided with a pair of laterally extending pocketed lugs, said base having fixed contacts thereon, a casing rotatable on said base and having contacts adapted to bridge the contacts of said base, and a locking bolt within said casing and operable from the exterior thereof adapted to enter the pocketed lugs of said post when the casing is moved to certain positions, said casing being movable at all times in positions in which said locking bolt is out of alinement with either of said pocketed lugs.

6. A switch comprising a base having an axial post extending therefrom and being provided with two sets of contacts, a casing rotatable on said base with the axis thereof coincident with that of said post, permutation locking mechanism in said casing arranged off-center and having a radially-disposed lock bolt, and means on said axial post adapted for coöperation with said lock bolt to lock the casing against movement when in certain positions.

7. A switch comprising a circular base having an axial post extending therefrom and having its outer end reduced in diameter to form a shoulder, a casing having a peripheral flange adapted to overlap said base, and a central opening through which the outer end of said axial post extends, the wall of said casing bearing against the shoulder on said post, a bonnet covering the projecting end of said axial post and having a notch in its inner peripheral surface, said axial post having a lug extending into the notch of said bonnet, a screw passing through the wall of said bonnet and taking into said lug, a push rod extending axially through said post and bonnet and normally projected to extend outside of said bonnet, and a pair of spaced contacts inclosed by said base and adapted to be brought into engagement by depressing said push rod.

8. In a switch, the combination of a base having an axial post, a pair of spaced contacts inclosed by said base, a push rod extending axially through said post, a casing rotatable on said base, means to cause said push rod to rotate with said casing, and means to prevent depression of said push rod when said casing is in certain positions.

9. In a switch, the combination of a base having an axial post and an axial bore extending through said post, said bore being enlarged at its outer end to provide an outstanding wall, said wall having a cutaway portion, a plurality of contacts on said base, a casing rotatable on said base and having contacts adapted to bridge certain contacts on said base, said casing having the outer end of said axial post extending therethrough and being provided with a notched outstanding lug, a push rod extending through the axial bore of said post and having an arm normally positioned outside of the outstanding wall of said post and positioned at all times in the notch of said lug, a pair of contacts spaced apart and covered by said base, a push rod extending through said axial post and compelled to rotate with said casing, the arm of said push rod permitting depression of said push rod only when said arm is in line with the cut-away portion of said post.

10. A switch comprising a base having an axial post provided at its outer end with a cut-away portion, a push rod extending through said post, a pair of contacts covered by said base and adapted to be brought into engagement by depressing said push rod, an arm extending from said push rod and normally positioned beyond the extremity of said post, said arm permitting depression of said push rod only when moved in line with the cut-away portion of said post.

11. In a switch, the combination of a base having two circular series of fixed contacts thereon and an axial post extending therefrom, a casing rotatable with said post as its center and having contacts adapted to bridge certain of said fixed contacts, a push rod extending axially through said post, means for compelling said push rod to rotate with said casing, a pair of spaced contacts situated adjacent the inner end of said push rod and adapted to be engaged by depressing said push rod, and means to permit depression of said push rod only when said casing is in certain position.

12. In a switch, the combination with a support having fixed contacts spaced apart, a manipulating device having a pocket adapted to receive a roller contact serving to bridge the contacts of said support, and an insulation roller in said pocket contiguous to said roller contact and adapted to prevent sparking when said roller contact leaves the contacts of said support.

13. A switch comprising a base having spaced contacts thereon, a casing movable on said base, permutation locking mechanism comprising a rotatable spindle, tumblers on said spindle and a lock-bolt adapted to engage a portion of said base to lock said casing against rotation when in certain positions, and a push rod normally projected and extending through said spindle and adapted to bring said spaced contacts into engagement.

14. A switch comprising a base having a pair of spaced contacts, a casing rotatable on said base, permutation locking mechanism within said casing adapted for coöperation with a portion of said base to lock said casing in a certain position, and means extending through said permutation locking mechanism adapted upon actuation to bring said spaced contacts into engagement.

15. In a switch, the combination of a base having two circular series of contacts secured thereto, a casing rotatable on said base and having contacts adapted to bridge certain contacts of the two series on said base, one contact of one series on said base being widened, a spring arm extending above the widened portion of said last-mentioned contact and normally out of engagement therewith, and a push rod carried by said casing and projecting therefrom adapted to be depressed and cause said spring contact to engage said widened contact.

16. In a switch, the combination of a base having two circular series of contacts, a casing rotatable on said base, a pair of spaced contacts within the base, a push rod extending axially through said casing and base and adapted when depressed to bring said spaced contacts into engagement, a plurality of contacts carried by said casing and adapted to connect certain contacts of the two series of said base, a spring contact normally spaced from one of the contacts of one of said series, a push rod carried by said casing and arranged off-center, the outer end of said last-mentioned push rod extending outside of said casing and the inner end being adapted to press said spring contact in engagement in its coöperating fixed contact.

In testimony whereof I affix my signature in presence of two witnesses.

THEODORE D. ROBINSON.

Witnesses:
 EMIL NEUHART,
 JACOB OBERST, Jr.